United States Patent
Ohara et al.

(10) Patent No.: US 11,570,817 B2
(45) Date of Patent: Jan. 31, 2023

(54) USER EQUIPMENT AND BASE STATION APPARATUS FOR TRANSMITTING A RANDOM ACCESS PREAMBLE

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 52 days.

(21) Appl. No.: 16/636,175

(22) PCT Filed: Aug. 9, 2017

(86) PCT No.: PCT/JP2017/029002
§ 371 (c)(1),
(2) Date: Feb. 3, 2020

(87) PCT Pub. No.: WO2019/030873
PCT Pub. Date: Feb. 14, 2019

(65) Prior Publication Data
US 2020/0178307 A1 Jun. 4, 2020

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 56/001* (2013.01); *H04W 74/006* (2013.01); *H04W 74/0866* (2013.01)

(58) Field of Classification Search
CPC ........... H04W 74/0883; H04W 56/001; H04W 74/0866; H04W 74/006; H04L 5/0053
See application file for complete search history.

(56) References Cited

U.S. PATENT DOCUMENTS 10,736,148 B2 * 8/2020 Li .................. H04W 74/008
10,897,295 B2 * 1/2021 Cheng ............... H04J 13/0062
(Continued)

FOREIGN PATENT DOCUMENTS

WO 2018/129123 A1 7/2018
WO 2018/203628 A1 11/2018

OTHER PUBLICATIONS

International Search Report issued in PCT/JP2017/029002 dated Oct. 31, 2017 (5 pages).
(Continued)

*Primary Examiner* — Diane L Lo
*Assistant Examiner* — Abusayeed M Haque
(74) *Attorney, Agent, or Firm* — Osha Bergman Watanabe & Burton LLP (57) ABSTRACT

A user equipment for communicating with a base station apparatus is disclosed, the user equipment including a receiver that receives information related to random access; a processor that identifies, based on the information related to the random access, a first preamble format, a second preamble format, and random access channel resources; a transmitter that transmits a random access preamble using the random access channel resources, wherein the transmitter transmits the random access preamble using a last resource in a time domain of the random access channel resources and the second preamble format, and the transmitter transmits the random access preamble using a resource other than the last resource in the time domain and the first preamble format. In other aspects, a base station apparatus and a communication method are also disclosed.

20 Claims, 8 Drawing Sheets

(51) Int. Cl.
*H04W 56/00* (2009.01)
*H04W 74/00* (2009.01)

(56) References Cited

U.S. PATENT DOCUMENTS

| | | | | |
|---|---|---|---|---|
| 2018/0343679 | A1* | 11/2018 | Sahlin | H04W 16/28 |
| 2018/0359653 | A1* | 12/2018 | Svedman | H04W 56/0015 |
| 2019/0174516 | A1* | 6/2019 | Shimezawa | H04W 72/04 |
| 2019/0281624 | A1 | 9/2019 | Kim et al. | |
| 2020/0092831 | A1* | 3/2020 | Åstrm | H04L 5/0048 |
| 2020/0119800 | A1* | 4/2020 | Rune | H04W 72/005 |
| 2020/0229152 | A1* | 7/2020 | Park | H04L 5/0094 |

OTHER PUBLICATIONS

Written Opinion of the International Searching Authority issued in PCT/JP2017/029002 dated Oct. 31, 2017 (4 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
Extended European Search Report issued in counterpart European Patent Application No. 17921066.1, dated Jul. 6, 2021 (11 pages).
NTT DOCOMO, Inc.; "Views on random access channel for NR"; 3GPP TSG RAN WG1 AH_NT Meeting, R1-1700613; Spokane, USA; Jan. 16-20, 2017 (11 pages).
Samsung; "Considerations on RACH design"; 3GPP TSG RAN WG1 Meeting #89, R1-1707939; Hangzhou, China; May 15-19, 2017 (4 pages).
Office Action issued in the counterpart Australian Patent Application No. 2017426743; dated Aug. 24, 2022 (4 pages).
Office Action issued in Australian Application No. 2017426743; dated Nov. 17, 2022 (3 pages).

* cited by examiner

| Preamble format | | # of Sequence | TCP | TSEQ | TGP | Path profile (Ts) | Path profile (us) | Maximum Cell radius (meter) | Use case |
|---|---|---|---|---|---|---|---|---|---|
| A | 0 | 1 | 144 | 2048 | 0 | 48 | 1.56 | 469 | TA is already known or Very small cell |
| | 1 | 2 | 288 | 4096 | 0 | 96 | 3.13 | 938 | Small cell |
| | 2 | 4 | 576 | 8192 | 0 | 144 | 4.69 | 2,109 | Normal cell |
| | 3 | 6 | 864 | 12288 | 0 | 144 | 4.69 | 3,516 | Normal cell |
| B | 0 | 1 | 144 | 2048 | 0 | 48 | 1.56 | 469 | TA is already known or Very small cell |
| | 1 | 2 | 192 | 4096 | 96 | 96 | 3.13 | 469 | Small cell |
| | 2 | 4 | 360 | 8192 | 216 | 144 | 4.69 | 1,055 | Normal cell |
| | 3 | 6 | 504 | 12288 | 360 | 144 | 4.69 | 1,758 | Normal cell |
| | 4 | 12 | 936 | 24576 | 792 | 144 | 4.69 | 3,867 | Normal cell |
| C | 0 | 1 | 1240 | 2048 | 0 | 144 | 4.69 | 5300 | Normal cell |
| | 1 | 2 | 1384 | 4096 | 0 | 144 | 4.69 | 6000 | Normal cell |

USER EQUIPMENT AND BASE STATION APPARATUS FOR TRANSMITTING A RANDOM ACCESS PREAMBLE

TECHNICAL FIELD

The present invention relates to user equipment and a base station apparatus of a radio communication system.

BACKGROUND ART

In 3GPP (3rd Generation Partnership Project), in order to achieve a further increase in the system capacity, a further increase in the data transmission rate, a further reduction in latency in the radio section, and so forth, a study of a radio communication scheme referred to as 5G or NR (New Radio) has been progressed (the radio communication scheme is referred to as "NR," hereinafter). For NR, in order to meet the requirement that the latency in the radio section is reduced to be less than or equal to 1 ms, while achieving the throughput of greater than or equal to 10 Gbps, various types of radio technology have been studied.

In NR, during initial access for establishing a connection between user equipment and a base station apparatus, the user equipment obtains a part of system information, which is required for cell detection and cell identification based on a synchronization signal transmitted from the base station apparatus and the initial access (e.g., Non-Patent Document 1).

Further, in NR, it is assumed that a wide frequency range is used, which is from a low frequency band similar to that of LTE (Long Term Evolution) to a frequency band that is higher than that of LTE. Especially, as propagation loss is large in a high frequency band, in order to compensate for the propagation loss, it has been studied to apply beam forming with a narrow beam width (e.g., Non-Patent Document 2).

RELATED ART DOCUMENT

Non-Patent Document

Non-Patent Document 1: 3GPP TS 36.213 V14.3.0 (2017-06)

Non-Patent Document 2: 3GPP TS 36.211 V14.3.0 (2017-06)

SUMMARY OF THE INVENTION

Problem to be Solved by the Invention

In NR, a part of the synchronization signal and the system information that is required for the initial access is mapped onto a radio frame on a basis of a resource unit called an SS block (Synchronization Signal block), which is formed of successive OFDM (Orthogonal Frequency Division Multiplexing) symbols. The user equipment receives the SS block transmitted from the base station apparatus to obtain information required for the initial access. The information required for the initial access includes information for identifying a preamble format and a RACH (Random Access Channel) resource.

Additionally, for NR, multiple preamble formats have been studied that correspond to use cases of multiple frequency bands, multiple maximum cell radiuses, and so forth. As a result, an overhead may increase that is for signaling information required for the initial access, which is for identifying the preamble format and the RACH resource to be used.

The present invention has been achieved in view of the above-described point, and an object is to provide a technique for achieving efficient initial access between the user equipment and the base station apparatus by reducing the overhead for signaling the information required for the initial access in the radio communication system.

Means to Solve the Problem

According to the disclosed technology, there is provided user equipment including a receiving unit that communicates with a base station apparatus to receive information to be used for initial access from the base station; a control unit that determines a plurality of preamble formats based on an index included in the information to be used for the initial access, and that determines one or more resources based on the information to be used for the initial access; and a transmitting unit that transmits a preamble to the base station apparatus using the plurality of preamble formats and the one or more resources.

Advantageous Effects of the Invention

According to the disclosed technology, efficient initial access can be achieved between the user equipment and the base station apparatus by reducing the overhead for signaling the information required for the initial access in the radio communication system.

EMBODIMENTS OF THE INVENTION

In the following, an embodiment of the present invention is described by referring to the drawings. Note that the embodiment described below is an example, and embodiments to which the present invention is applied are not limited to the embodiment described below.

For the operation of the radio communication system according to the embodiment, the existing technology is appropriately used. The existing technology may be, for example, the existing LTE; however, the existing technology is not limited to the existing LTE. Additionally, the term "LTE" used in this specification has a broad meaning including LTE-Advanced and schemes on and after LTE-Advanced (e.g., NR), unless as otherwise specified.

Further, in the embodiment described below, the terms are used, which are used in the existing LTE, such as SS (Synchronization Signal), PSS (Primary SS), SSS (Secondary SS), and PBCH (Physical broadcast channel); however, this is for convenience of the description, and signals, functions, and so forth similar to these may be referred to by different names. Furthermore, the above-described terms in NR are denoted as NR-SS, NR-PSS, NR-SSS, NR-PBCH, etc.

<System Configuration>

Figure 1:
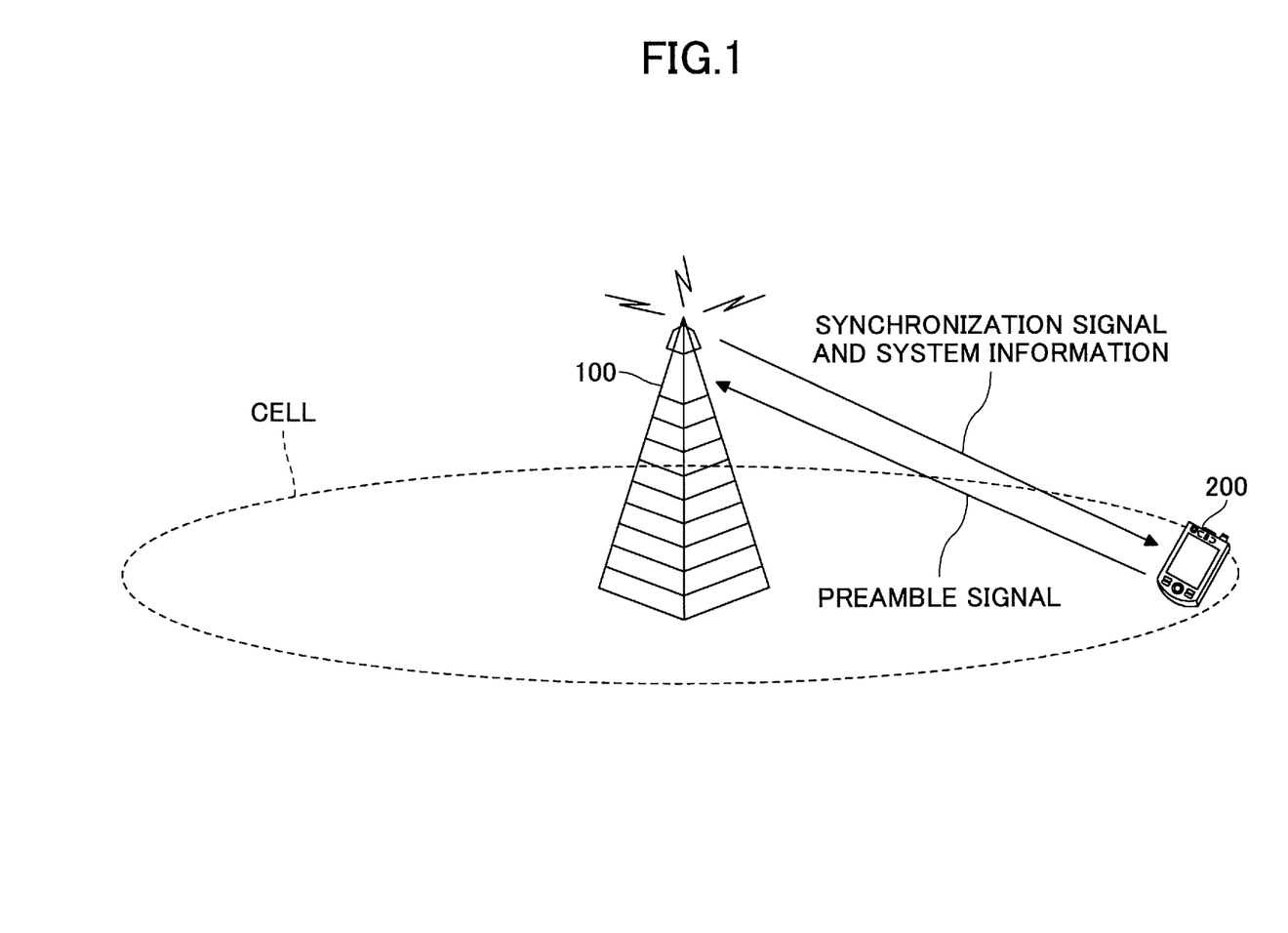
FIG. 1 is a diagram illustrating an example of a configuration of a radio communication system according to an embodiment of the present invention.

FIG. 1 is a diagram illustrating an example of a configuration of a radio communication system according to the embodiment of the present invention. The radio communication system according to the embodiment of the present invention includes a base station apparatus 100 and user equipment 200, as illustrated in FIG. 1. In FIG. 1, the single base station apparatus 100 and the single unit of user equipment 200 are illustrated; however, this is an example, and there may be a plurality of base station apparatuses 100 and a plurality of units of user equipment 200.

The base station apparatus 100 is a communication device that provides one or more cells, and that executes radio communication with the user equipment 200. As illustrated in FIG. 1, the base station apparatus 100 transmits a synchronization signal and system information to the user equipment 200. The synchronization signal is, for example, the NR-PSS and the NR-SSS. The system information is transmitted, for example, through the NR-PBCH. Each of the base station apparatus 100 and the user equipment 200 is capable of communicating signals by performing beam forming. The user equipment 200 is a communication device provided with a radio communication function, such as a smartphone, a cellular phone, a tablet, a wearable terminal, and an M2M (Machine-to-Machine) communication module; and the user equipment 200 wirelessly connects to the base station apparatus 100, and utilizes various types of communication services provided by the radio communication system. As illustrated in FIG. 1, at a step of the initial access, the user equipment 200 transmits a random access preamble signal to the base station apparatus 100. The random access is executed based on, in addition to the system information received from the base station apparatus 100 through the NR-PBCH, system information through the NR-PDSCH (Physical downlink shared channel).

Note that, in the embodiment, the duplex scheme may be a TDD (Time Division Duplex) scheme, a FDD (Frequency Division Duplex) scheme, or any other scheme (e.g., Flexible Duplex).

Further, in the following description, transmitting a signal using a transmit beam may imply transmitting a signal which is multiplied by a precoding vector (or which is precoded by the precoding vector). Similarly, receiving a signal using a reception beam may imply multiplying the received signal by a predetermined weight vector. Further, transmitting a signal using a transmit beam may be expressed as transmitting the signal with a specific antenna port. Similarly, receiving a signal using a reception beam may be expressed as receiving the signal with a specific antenna port. The antenna port refers to a logical antenna port or a physical antenna port defined by the 3GPP standard. Note that a method of forming a transmit beam and a reception beam is not limited to the above-described method. For example, a method may be used such that, in the base station apparatus 100 provided with a plurality of antennas and the user equipment 200 provided with a plurality of antennas, angles of the respective antennas are changed; a method may be used which combines a method using precoding vectors and a method of changing angles of antennas; a method may be used which combines a method of switching different antenna panels to utilize and a method of using multiple panels together; or any other method may be used. Furthermore, for example, in a high frequency band, a plurality of mutually different transmit beams may be used. Using a plurality of transmit beams is referred to as a multiple beam operation; and using a single transmit beam is referred to as a single beam operation.

EXAMPLE 1

In the following, an example 1 described.

Figure 2:
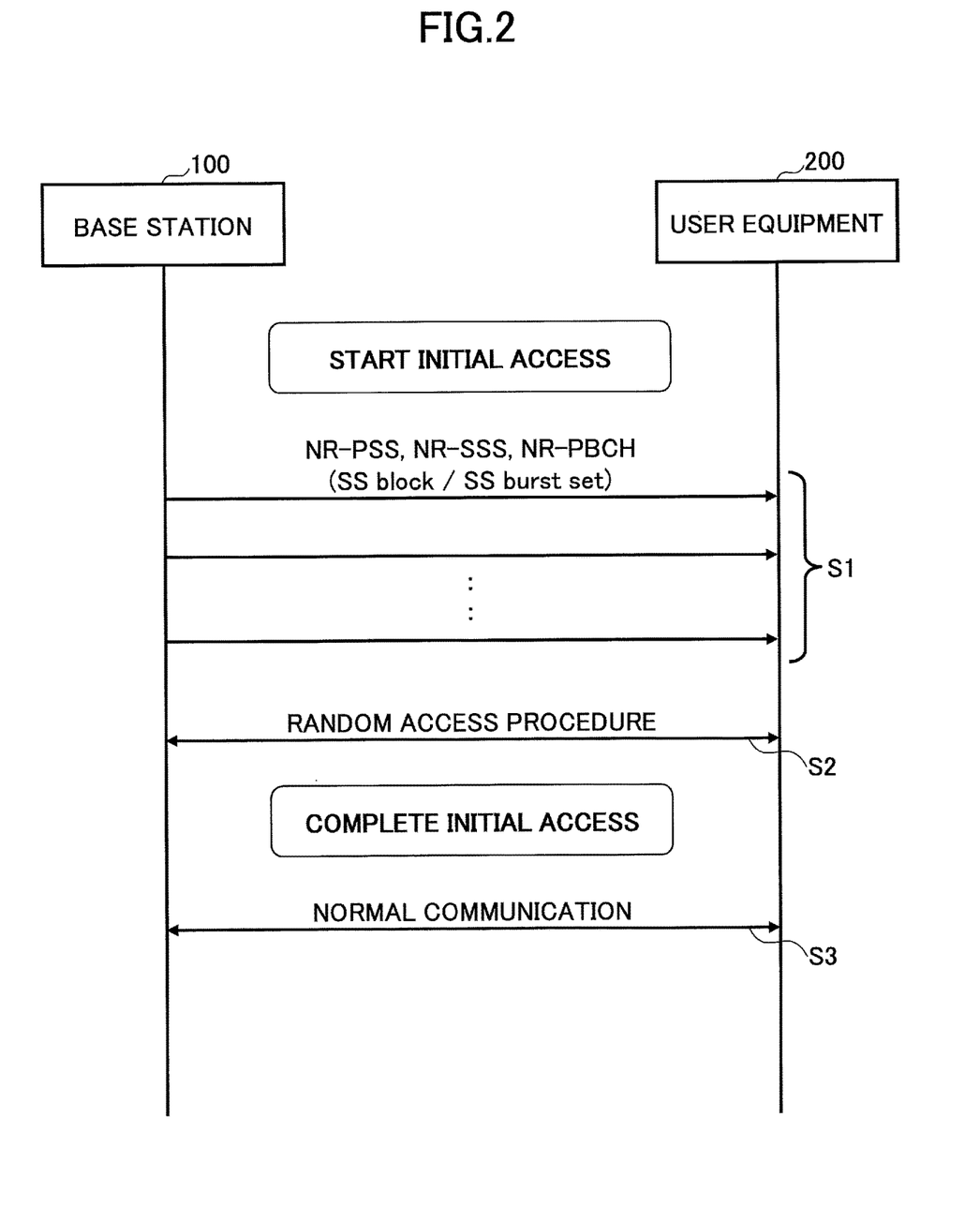
FIG. 2 is a diagram illustrating an example of an initial access sequence according to the embodiment of the present invention.

FIG. 2 is a diagram illustrating an example of an initial access sequence in the embodiment of the present invention. In response to the start of the initial access, the base station apparatus 100 transmits, at step S1, the NR-PSS, the NR-SSS, and the NR-PBCH, i.e., the SS block, to the user equipment 200. The NR-PBCH includes a part of the system information. The base station apparatus 100 repeatedly transmits, to the user equipment 200, the SS burst set formed of a plurality of SS blocks at a cycle of SS burst set periodicity. When the SS burst set includes a plurality of SS blocks, the plurality of SS blocks may be associated with different beams, respectively, in a multi-beam operation environment.

The user equipment 200 receives the NR-PSS transmitted from the base station apparatus 100, and the user equipment 200 uses it, at least, for initial time and frequency synchronization and for identifying a part of the cell ID (identify). Additionally, the user equipment 200 receives the NR-SSS transmitted from the base station apparatus 100, and the user equipment 200 uses it, at least, for identifying a part of the cell ID. Furthermore, the user equipment 200 receives the NR-PBCH transmitted from the base station apparatus 100 and obtains a part of the system information required for the initial access, such as a system frame number (SFN: System Frame Number) and information, etc., for obtaining any other system information. The other system information may be received through the NR-PDSCH, and the other system information includes a resource for executing a random access procedure, namely, information for identifying a preamble format, a RACH resource, and so forth. Furthermore, when the SS burst set includes a plurality of SS blocks, upon obtaining a specific SS block, the user equipment 200 transmits a preamble using a resource corresponding to a beam associated with the SS block to start the random access procedure (S2).

If, at step S2, the random access procedure between the base station apparatus and the user equipment 200 is successful, the initial access is completed, and the normal communication is started (S3).

Figure 3:
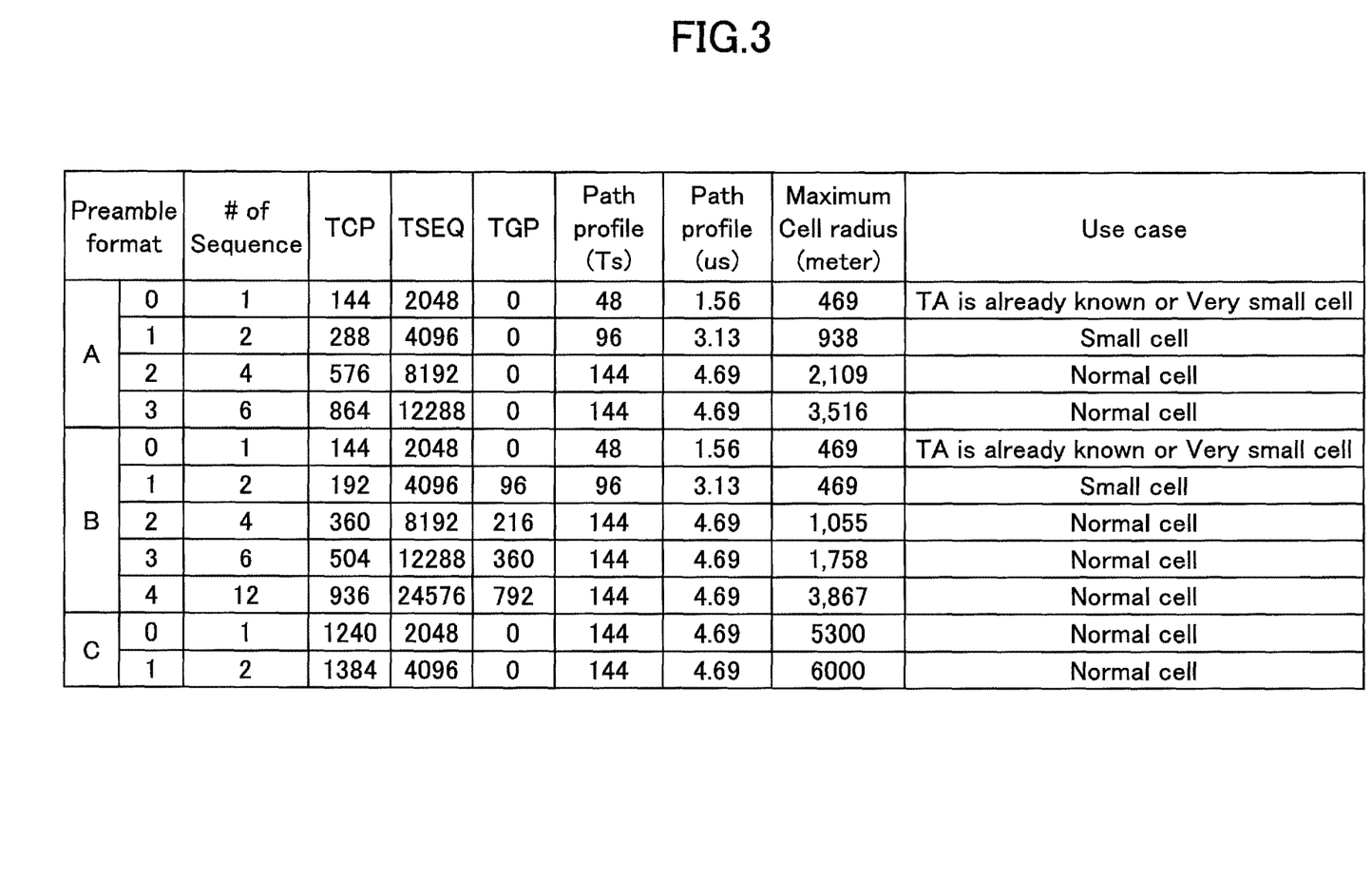
FIG. 3 is a diagram illustrating an example of PRACH preamble formats according to the embodiment of the present invention.

FIG. 3 is a diagram illustrating an example of the PRACH preamble formats in the embodiment of the present invention. The unit of time Ts (Basic time unit) in FIG. 3 is defined to be 1/30.72 MHz=approximately 0.03255 micro seconds. Further, the example of the PRACH (Physical RACH) preamble formats illustrated in FIG. 3 are applied, if the sequence length $N_{zc}$ is 139 or 127 and the subcarrier spacing is 15 kHz. The PRACH preamble formats are scaled by the subcarrier spacing, and Ts is defined as described below:

Ts=1/(2*30.72) MHz for 30 kHz;
Ts=1/(4*30.72) MHz for 60 kHz; and
Ts=1/(8*30.72) MHz for 120 kHz.

The "If of Sequence" shown in FIG. 3 is a number of repetitions of a sequence included in the PRACH preamble. The "TCP" represents a CP (Cyclic Prefix) length in units of Ts. The "TSEQ" represents a sequence length in the time axis in units of Ts. The "TGP" represents a GP (Guard Period) length in units of Ts. The "Path profile" represents a path delay profile in units of Ts or in units of us. The "Maximum Call radius" is a corresponding maximum cell radius. The "Use case" represents a situation in which the PRACH preamble format is used, which is one of "TA (Timing Alignment) is already known or very small," "small cell," and "normal cell." Furthermore, as for the PRACH preamble format, there are a format, which has the subcarrier spacing that is the same as that of the PRACH for transmitting the preamble, with a time length that is adjusted to the OFDM symbol boundary of data, and a format with a time length that is not adjusted to the OFDM symbol boundary.

In the following, the PRACH preamble format is referred to as the preamble format. As shown in FIG. 3, as for the preamble format, for example, 11 types, which are A0, A1, A2, A3, B0, B1, B2, B3, B4, C0, and C1, or a part of them may be defined. In the following, when the preamble formats A0, A1, A2, and A3 are not distinguished, they are referred to as the preamble format A. Similarly, in the following, when the preamble formats B0, B1, B2, B3, and B4 are not distinguished, they are referred to as the preamble format B. Similarly, in the following, when the preamble formats C0 and C1 are not distinguished, they are referred to as the preamble format C.

The TGP is 0 for the preamble format A. A GP is attached to each of the preamble formats B1, B2, B3, and B4. A TCP that is greater than those of the other preamble formats is attached to the preamble format C, and the maximum cell radius is large.

During start of the random access procedure, the user equipment 200 identifies which preamble format is to be used, based on the system information transmitted from the base station apparatus 100.

As an example of an operating condition of the preamble format, for example, use of each of the preamble formats A0, A1, A2, and A3 is limited to a case in which the subsequent symbol is a RACH resource or an unused resource, or a case in which the cell radius can be covered with the CP, etc., attached to the subsequent symbol because no GP is attached to each of the preamble formats A0, A1, A2, and A3. Furthermore, as an example of another operating condition, if the subcarrier spacing is large, such as 60 kHz or 120 kHz, and the number of repetitions of the sequence is small, and if the maximum cell radius calculated from the CP and the GP becomes too small for the preamble format A or the preamble format B, it can be considered that the preamble format C is effective because the large TCP is attached to the preamble format C and the maximum cell radius calculated becomes relatively large.

If, for example, PRACH preamble format indices (which are referred to as the preamble indices, hereinafter), such as those corresponding to the PRACH Configuration Indices of LTE, are assigned to all the preamble formats, so as to be signaled from the base station apparatus 100 to the user equipment 200, the signaling overhead becomes large because, as described above, a case is assumed in which an operating condition of a specific preamble format is limited.

Furthermore, in NR, for example, a case is assumed in which a RACH resource is repeated within a slot. Thus, if the indices are individually signaled for respective RACH resources, the overhead further increases.

Figure 4:
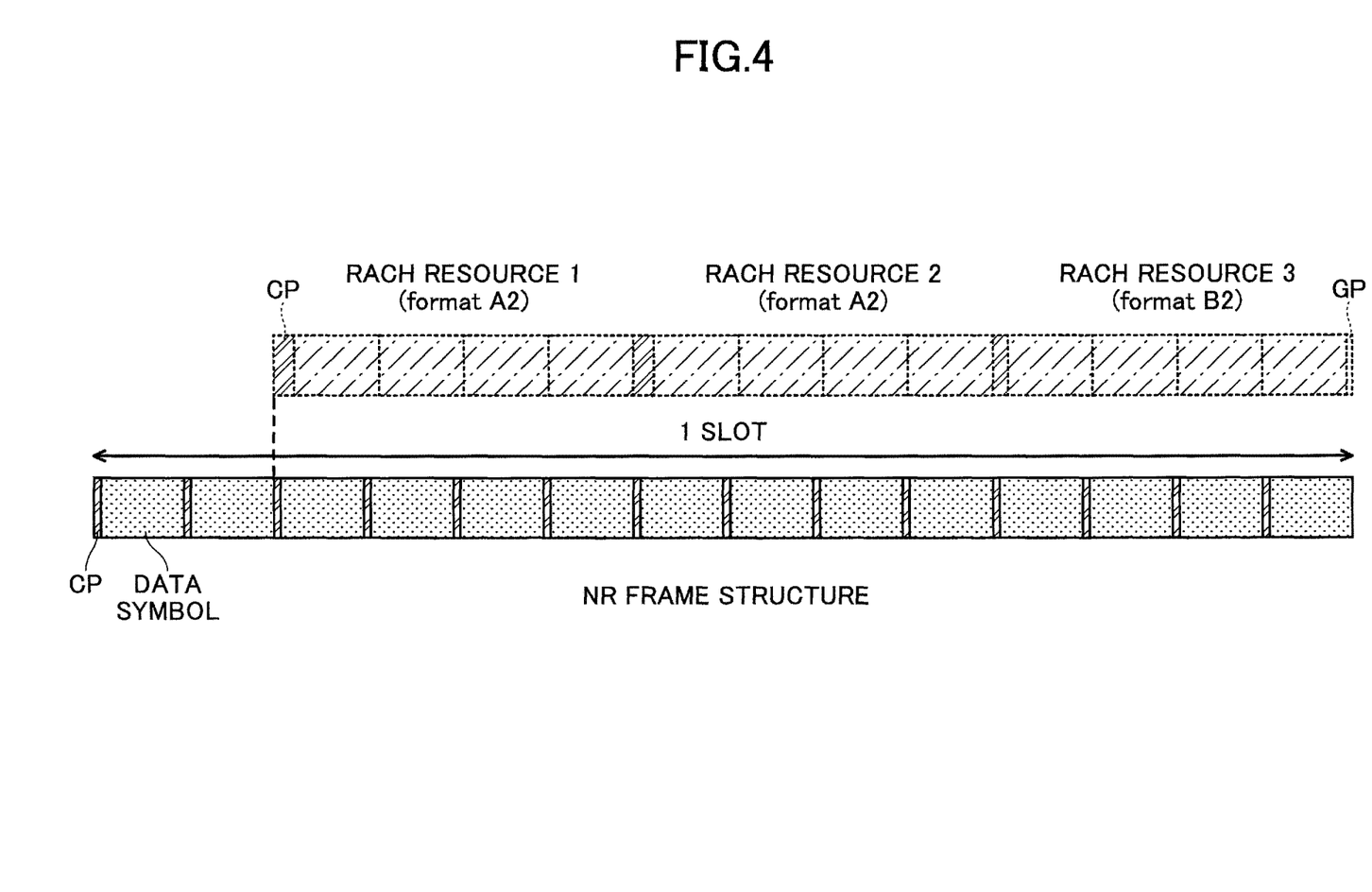
FIG. 4 is a diagram illustrating an example of RACH resources according to the embodiment of the present invention.

FIG. 4 is a diagram illustrating an example of the RACH resource in the embodiment of the present invention. As illustrated in FIG. 4, one slot of the radio frame of the NR includes 14 data symbols, and a CP is attached to the start of each data symbol. FIG. 4 depicts a case in which allocation of the RACH resource 1 is started so as to conform to the boundary of a data symbol of the slot, and the RACH resource 2 and the RACH resource 3 are allocated consecutively so that three RACH resources are allocated within the slot. The RACH resource 1 is allocated from the third symbol of the slot, and the second symbol from the start of the slot is used, for example, for downlink control information. In the example shown in FIG. 4, the CP is allocated at the start of each RACH resource, and the GP is allocated at the end of the RACH resource 3.

Here, as for a preamble index to be signaled to the user equipment 200, a single common preamble index for identifying the preamble format A and the preamble format B is signaled. For example, if the preamble format A2 and the preamble format B2 are to be specified, a preamble index "2" is signaled to the user equipment 200.

For example, if the user equipment 200 has been signaled that a RACH resource is repeated three times, as illustrated in FIG. 4, the preamble format B2 is specified for the last one of the repeated RACH resources, i.e., the third RACH resource, and the preamble format A2 is specified for the first and the second RACH resources. Namely, by signaling the preamble index "2" and "RACH resource is repeated three times," it may be implicitly signaled that the preamble format A2 is specified for the RACH resource 1; the preamble format A2 is specified for the RACH resource 2; and the preamble format B2 is specified for the RACH resource 3. Note that repetition of a RACH resource may not be completed within one slot, and the RACH resource may be repeatedly allocated across a plurality of slots.

Furthermore, similar to the above, if the preamble index "2" is signaled to the user equipment 200, the preamble format B2 may be specified for the RACH resource allocated at the end of the slot, and the preamble format A2 may be specified for the RACH resources other than the RACH resource at the end of the slot, regardless of a number of repetitions of the RACH resource.

Note that, similar to the above-described case of the preamble index "2," by signaling a preamble index "1" to the user equipment 200, the preamble format A1 and the preamble format B1 may be specified. Similarly, by signaling a preamble index "3" to the user equipment 200, the preamble format A3 and the preamble format B3 may be specified. Similarly, by signaling a preamble index "4" to the user equipment 200, the preamble format A4 and the preamble format B4 may be specified.

Another combination of preamble formats may be associated with a single preamble index to be signaled to the user equipment 200.

Note that a RACH resource may be specified based on a preamble index, or may be specified based on any other system information, etc.

In the above-described example 1, by the signaling of the common preamble index for specifying a plurality of preamble formats, a signaling overhead can be reduced, compared to a case in which preamble indices are individually signaled. Furthermore, if the RACH resource is repeated, a GP can be provided at the last one of the consecutive RACH resources because the preamble format B is specified for the last one of the RACH resources. Accordingly, when a preamble format without a GP is used, a process of securing a GP at the end of preamble becomes unnecessary.

Namely, by reducing an overhead for signaling information required for initial access in a radio communication system, efficient initial access can be achieved between user equipment and a base station.

EXAMPLE 2

An example 2 is described below. In the example 2, a point that is different from the example 1 is described. Accordingly, points that are not particularly described may be the same as those of the example 1.

As for a preamble index to be signaled to the user equipment 200, a single common preamble index for specifying the preamble format A and the preamble format C is signaled. For example, if the preamble format A0 and the preamble format C0 are specified, a preamble index "0" may be signaled to the user equipment 200.

If the above-described preamble index "0" is signaled, a preamble format to be used for a RACH resource may be specified depending on subcarrier spacing applied to a preamble. For example, if the subcarrier spacing is 60 kHz or 120 kHz, the preamble format C0 is specified, and if the subcarrier spacing is 15 kHz or 30 kHz, the preamble format A0 is specified.

Additionally, if the above-described preamble index "0" is signaled, a preamble format to be used for a RACH resource may be specified depending on a frequency band. For example, if a RACH resource is in a frequency band higher than or equal to 6 GHz, the preamble format C0 is specified; if a RACH resource is in a frequency band lower than 6 GHz, the preamble format A0 is specified.

Similar to the above-described combination of the preamble format A and the preamble format C, a single common preamble index for identifying the preamble format B and the preamble format C may be signaled. For example, if the preamble format B1 and the preamble format C1 are specified, a preamble index "1" may be signaled to the user equipment 200.

If the above-described preamble index "1" is signaled, a preamble format to be used for an RACH resource may be specified depending on subcarrier spacing applied to a preamble. For example, if the subcarrier spacing is 60 kHz or 120 kHz, the preamble format C1 is specified; if the subcarrier spacing is 15 kHz or 30 kHz, the preamble format B1 is specified.

Additionally, if the above-described preamble index "1" is signaled, a preamble format to be used for a RACH resource may be specified depending on a frequency band. For example, if a RACH resource is in a frequency band higher than or equal to 6 GHz, the preamble format C1 is specified; if a RACH resource is in a frequency band lower than 6 GHz, the preamble format B1 is specified.

Note that, when the combination of the preamble format A and the preamble format B in the example 1 is signaled by the preamble index, a preamble format may also be selected depending on subcarrier spacing or a frequency band, as described above.

In the above-described embodiment 2, by signaling a common preamble index specifying a plurality of preamble formats, a signaling overhead can be reduced compared to a case in which preamble indices are individually signaled.

Furthermore, by specifying a preamble format depending on subcarrier spacing or a frequency band, a property of the preamble format C having a large maximum cell radius can be appropriately utilized.

Namely, by reducing an overhead for signaling information required for initial access in a radio communication system, efficient initial access can be achieved between user equipment and a base station apparatus.

EXAMPLE 3

An example 3 is described below. In the example 3, a point that is different from the examples 1 and 2 is described. Accordingly, points that are not particularly described may be the same as those of the examples 1 and 2.

Figure 5:
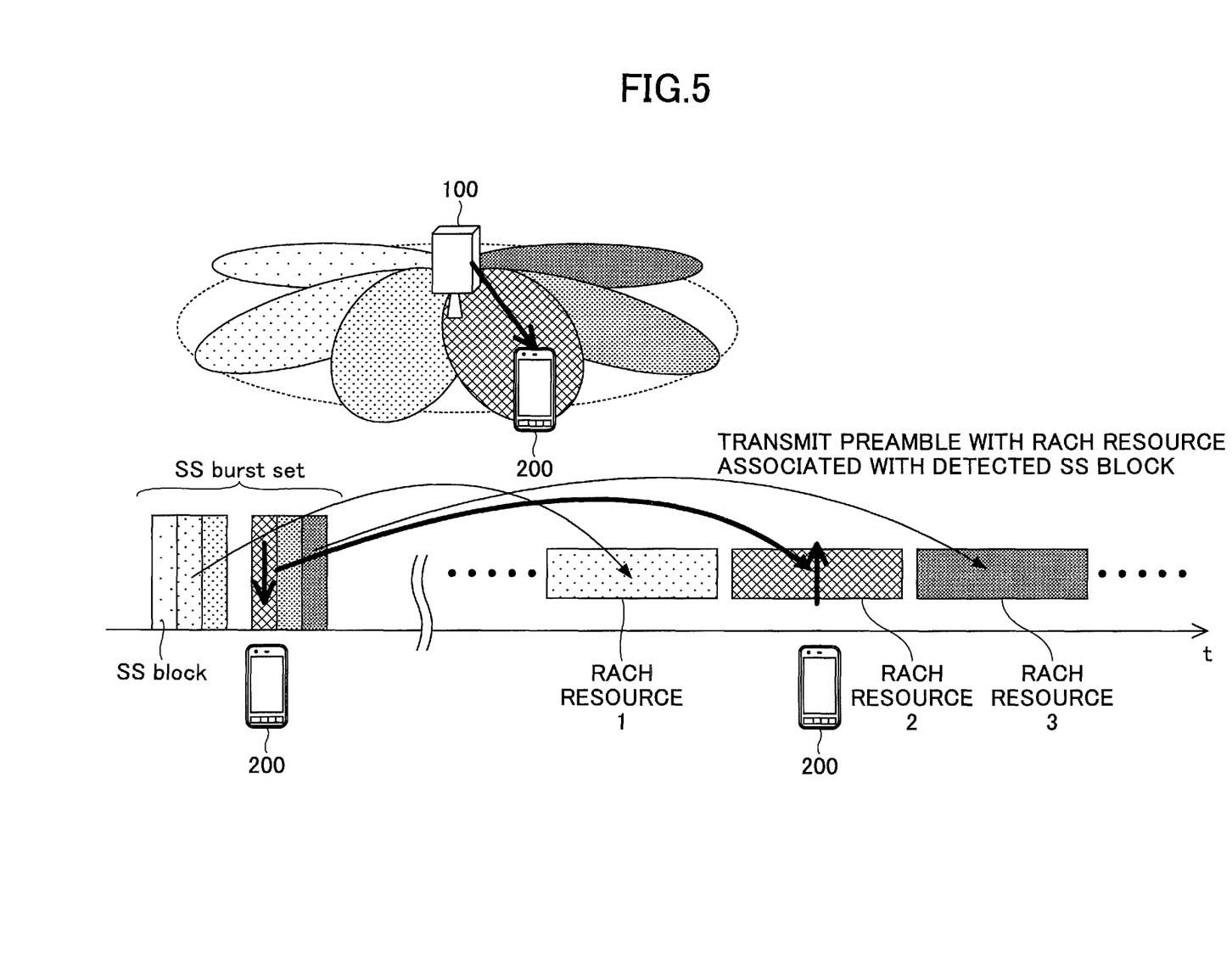
FIG. 5 is a diagram illustrating an example of the RACH resources associated with SS blocks according to the embodiment of the present invention.

FIG. 5 is a diagram illustrating an example of RACH resources associated with SS blocks in the embodiment of the present invention. As illustrated in FIG. 5, in NR, an SS burst set including SS blocks associated with beams may be transmitted from the base station apparatus 100. The user equipment 200 receives a detectable SS block, and transmits a preamble with a RACH resource associated with the received SS block. The RACH resource may be associated with a beam.

In the example shown in FIG. 5, the user equipment 200 receives the fourth SS block included in the SS burst set, and transmits a preamble with the RACH resource 2 associated with the fourth SS block. Additionally, in the example shown in FIG. 5, the second SS block included in the SS burst set is associated with the RACH resource 1, and the sixth SS block included in the SS burst set is associated with the RACH resource 3.

In NR, a plurality of RACH resources may be associated with a specific SS block, and the user equipment 200 selects a RACH resource to be used from the plurality of RACH resources. The example 1 and the example 2 may be applied to the plurality of RACH resources.

Furthermore, in NR, a specific RACH resource may be associated with a plurality of different SS blocks. In such a case also, the example 1 and the example 2 may be applied to the plurality of RACH resources that can be used by the user equipment 200.

Figure 6:
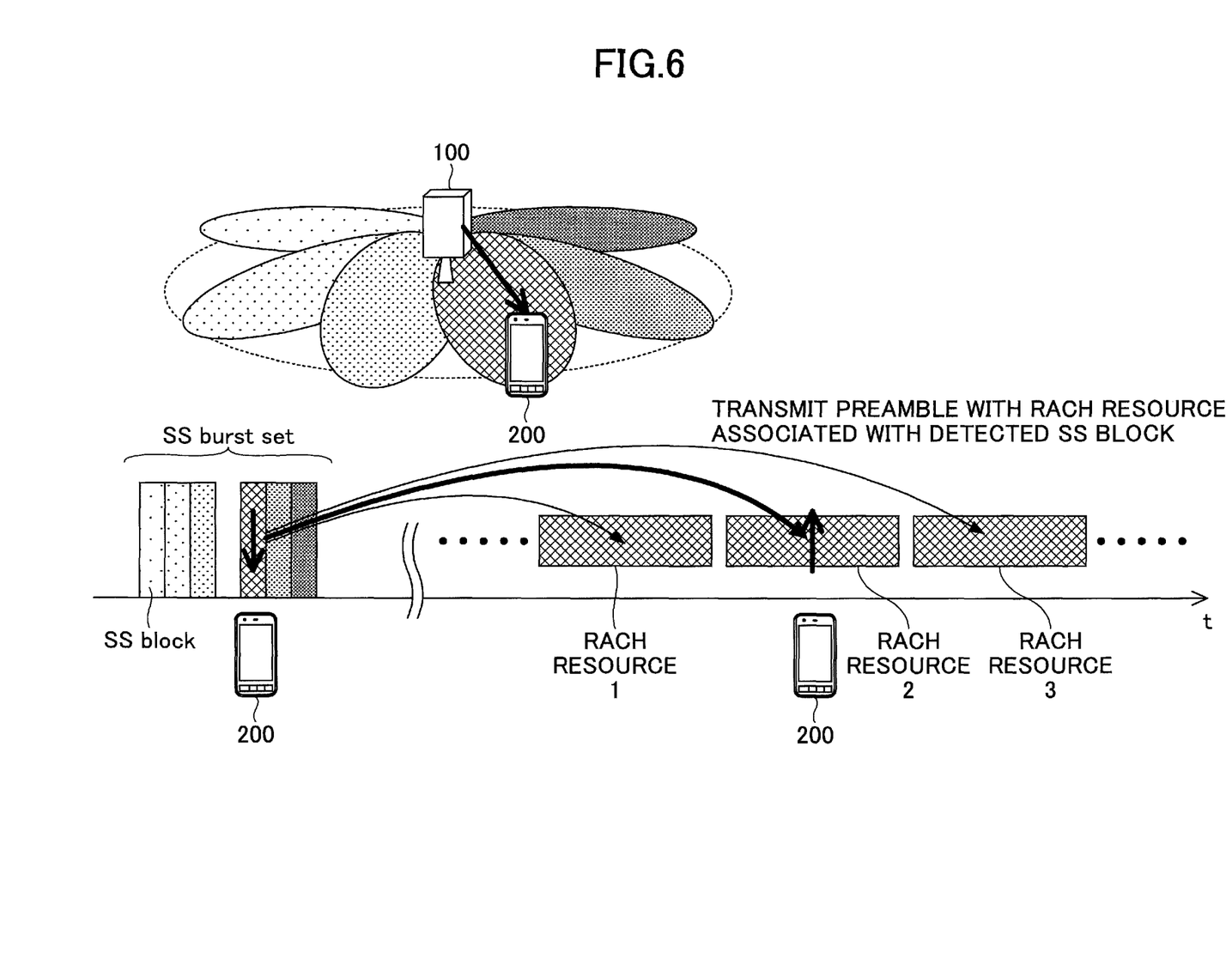
FIG. 6 is a diagram illustrating an example of a plurality of RACH resources associated with an SS block according to the embodiment of the present invention.

FIG. 6 is a diagram illustrating an example of a plurality of RACH resources associated with the SS blocks in the embodiment of the present invention. As shown in FIG. 6, the RACH resource 1, the RACH resource 2, and the RACH resource 3 are associated with the fourth SS block that is associated with a specific beam and that is included in the SS burst set. In FIG. 6, suppose that, similar to FIG. 4, the preamble format A2 is specified for the RACH resource 1 and the RACH resource 2, the preamble format B2 is specified for the RACH resource 3, and the allocations of the CP and the GP are the same as those of FIG. 4. Here, the maximum cell radius for which the propagation delay is considered can be determined by a value obtained by adding a CP length of a resource subsequent to a RACH resource (for the last RACH resource, a CP length of a subsequent data resource) and a GP length allocated at the end of the RACH resource. If the above-described value is calculated for each RACH resource, the RACH resource 1 is 576 Ts, the RACH resource 2 is 360 Ts, and the RACH resource 3 is (160+216)=376 Ts, or (144+216)=360 Ts, and so forth. Namely, the RACH resource 1 can support the largest maximum cell radius.

If a plurality of RACH resources can be used, the user equipment 200 may select a RACH resource in accordance with a path-loss value calculated at the user equipment 200.

A signal to be measured may be, for example, a demodulation reference signal, or a synchronization signal, such as the NR-PSS or the NR-SSS. For example, if a path-loss value is greater than X dB, the RACH resource 1 may be selected. Further, for example, if a path-loss value is less than Y dB, the RACH resource 2 or the RACH resource 3 may be selected. The above-described X dB and Y dB may be predetermined values, or may be signaled from the base station apparatus 100 to the user equipment 200 through broadcast information, RRC (Radio Resource Control) signaling, or MAC (Medium Access Control) layer signaling.

Additionally, if a plurality of RACH resources can be used, the user equipment 200 may select a RACH resource depending on a cell. For example, the RACH resource 1 may be selected in a cell a, and the RACH resource 2 may be selected in a cell b. The cell a and the cell b may be differentiated by the user equipment 200 based on a cell ID, a type of a cell, or cell broadcast information, etc.

Additionally, in order to avoid interference between cells, the use of similar RACH resources in adjacent cells can be avoided. For example, if the RACH resource 1 is selected in a specific cell, the RACH resource 2 or the RACH resource 3 may be selected in a cell adjacent to the specific cell, so that the RACH resource 1 is not simultaneously used between the adjacent cells.

In the above-described example 3, even if RACH resources are associated with a SS block, by signaling a common preamble index for specifying a plurality of preamble formats, the user equipment 200 can reduce the signaling overhead compared to a case in which preamble indices are individually signaled.

Additionally, the user equipment 200 can select a RACH resource depending on a path-loss value or a cell.

(Device Configuration)

Next, examples of functional configurations of the base station apparatus 100 and the user equipment 200 are described, which execute the process and the operation described above. Each of the base station apparatus 100 and the user equipment 200 include, at least, a function for executing the examples 1, 2, and 3. However, each of the base station apparatus 100 and the user equipment 200 may include only a part of the functions of the examples 1, 2, and 3.

<The Base Station Apparatus 100>

Figure 7:
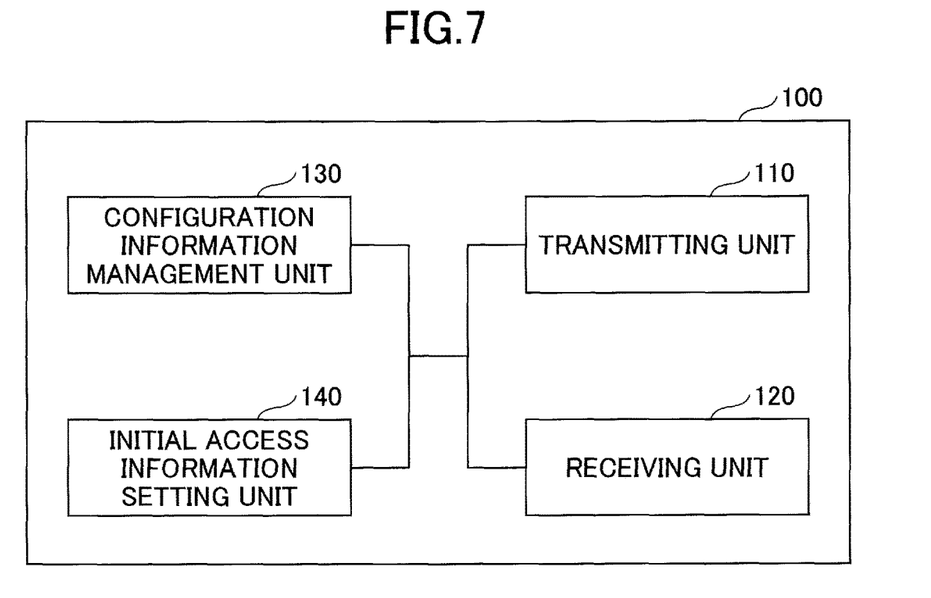
FIG. 7 is a diagram illustrating an example of a functional configuration of a base station apparatus 100.

FIG. 7 is a diagram illustrating an example of a functional configuration of the base station apparatus 100. As illustrated in FIG. 7, the base station apparatus 100 includes a transmitting unit 110; a receiving unit 120; a configuration information management unit 130; and an initial access information setting unit 140. Note that the functional configuration illustrated in FIG. 7 is merely an example. The functional division and the names of the functional units may be any division and names, provided that the operations of the embodiments of the present invention can be executed.

The transmitting unit 110 includes a function for generating a signal to be transmitted to the user equipment 200, and for wirelessly transmitting the signal. The receiving unit 120 includes a function for receiving various types of signals transmitted from the user equipment 200, and for retrieving, for example, higher layer information from the received signal. Further, the transmitting unit 110 includes a function for transmitting the NR-PSS, the NR-SSS, the NR-PBCH, a DL/UL control signal, etc., to the user equipment 200. Furthermore, the transmitting unit 110 transmits a synchronization signal and system information to the user equipment 200, and the receiving unit 120 receives a message, etc., related to a preamble and initial access from the user equipment 200.

The configuration information management unit 130 stores configuration information that is preconfigured and various types of configuration information to be transmitted to the user equipment 200. Content of the configuration information is, for example, system information, etc., used for initial access.

The initial access information setting unit 140 executes control related to transmission of system information including information used for a synchronization signal and initial access to the user equipment 200 in the base station apparatus 100, and executes control related to initial access from the user equipment 200, which are described in the examples 1, 2, and 3.

<User Equipment 200>

Figure 8:
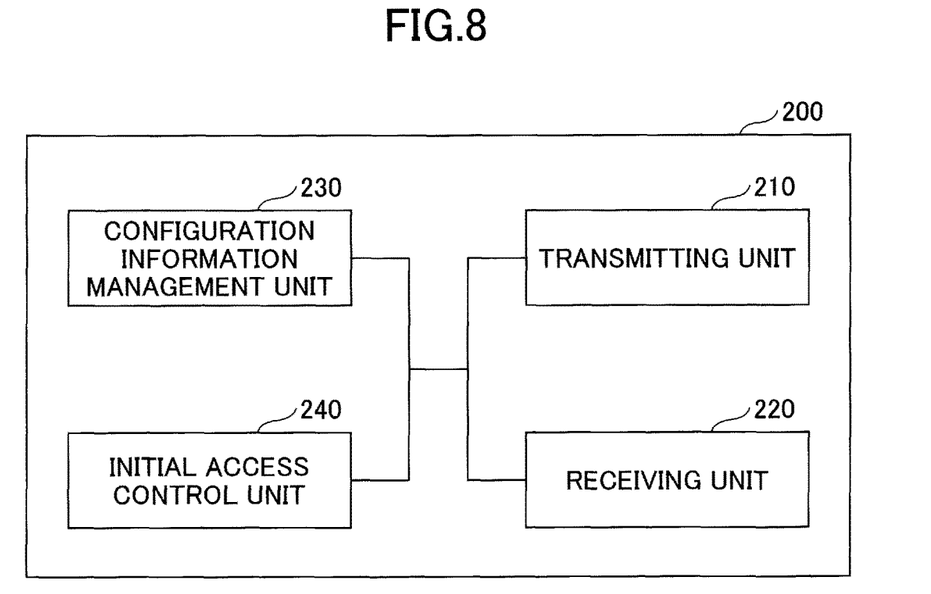
FIG. 8 is a diagram illustrating an example of a functional configuration of user equipment 200.

FIG. 8 is a diagram illustrating an example of a functional configuration of the user equipment 200. As illustrated in FIG. 8, the user equipment 200 includes a transmitting unit 210; a receiving unit 220; a configuration information management unit 230; and an initial access control unit 240. The functional configuration illustrated in FIG. 8 is merely an example. A functional division and names of functional units may be any functional division and names, as long as the operation according to the embodiments of the present invention can be executed.

The transmitting unit 210 creates a transmit signal from transmit data, and wirelessly transmits the transmit signal. The receiving unit 220 wirelessly receives various types of signals, and retrieves a higher layer signal from a received physical layer signal. Furthermore, the receiving unit 220 includes a function for receiving the NR-PSS, the NR-SSS, the NR-PBCH, a DL/UL control signal, etc., which are transmitted from the base station apparatus 100. Further, the transmitting unit 210 transmits a message, etc., related to a preamble and initial access to the base station apparatus 100, and the receiving unit 120 receives a synchronization signal and system information from the base station apparatus 100.

The configuration information management unit 230 stores various types of configuration information received from the base station apparatus 100 with the receiving unit 220. Additionally, the configuration information management unit 230 stores preconfigured configuration information. Content of the configuration information is, for example, information related to initial access, such as a preamble format.

The initial access control unit 240 executes control related to initial access in the user equipment 200, which is described in the examples 1, 2, and 3. Note that a functional unit related to preamble signal transmission, etc., in the initial access control unit 240 may be included in the transmitting unit 210, and a functional unit related to reception, etc., of the system information in the initial access control unit 240 may be included in the receiving unit 220.

<Hardware Configuration>

Note that the functional configuration diagrams (FIG. 7 and FIG. 8) used for the description of the above-described embodiments of the present invention indicate blocks in units of functions. These functional blocks (components) can be implemented by any combination of hardware and/or software. Furthermore, a method for implementing each functional block is not particularly limited. Namely, each functional block may be implemented by a single device that is physically and/or logically connected; or may be implemented by a plurality of devices by directly and/or indirectly connecting (e.g., by a wire line and/or a radio link) two or more devices that are physically and/or logically separated.

Figure 9:
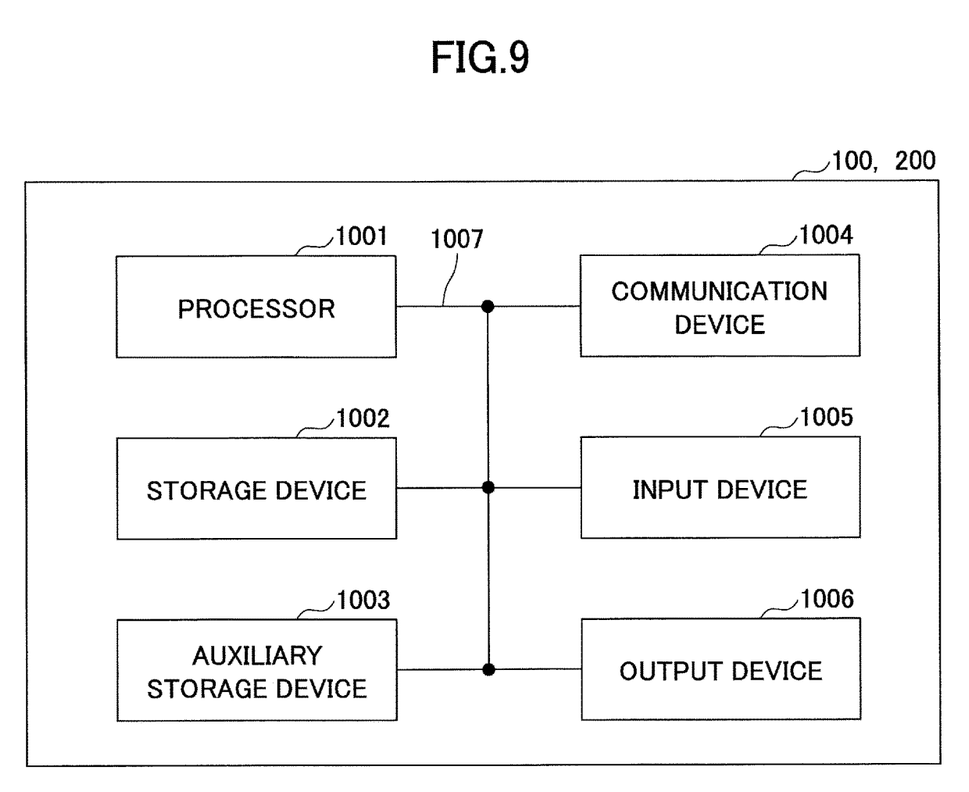
FIG. 9 is a diagram illustrating an example of a hardware configuration of the base station apparatus 100 and the user equipment 200.

For example, each of the base station apparatus 100 and the user equipment 200 according to the embodiment of the present invention may function as a computer for executing the process according to the embodiment of the present invention. FIG. 9 is a diagram illustrating an example of a hardware configuration of a radio communication device that is the base station apparatus 100 or the user equipment 200 according to the embodiments of the present invention. Each of the above-described base station apparatus 100 and the user equipment 200 may be physically configured as a computer device including a processor 1001; a storage device 1002; an auxiliary storage device 1003; a communication device 1004; an input device 1005; an output device 1006; a bus 1007, and so forth.

Note that, in the following description, the term "apparatus" can be interchangeable with a circuit, a device, a unit, etc. The hardware configuration of each of the base station apparatus 100 and the user equipment 200 may be configured to include one or a plurality of devices, which are indicated by 1001 through 1006, illustrated in the drawing; or may be configured not to include a part of the devices.

After loading predetermined software (program) on hardware, such as the processor 1001 and the storage device 1002, each function of the base station apparatus 100 and the user equipment 200 can be implemented by the processor 1001 by operating to control the communication by the communication device 1004 and/or reading out data and/or writing data in the storage device 1002 and the auxiliary storage device 1003.

The processor 1001, for example, operates the operating system to control the entire computer. The processor 1001 may be formed of a central processing unit (CPU: Central Processing Unit) including an interface with a peripheral device; a control device; a processor; a register; and so forth.

Furthermore, the processor 1001 reads out a program (program code), a software module, and/or data from the auxiliary storage device 1003 and/or the communication device 1004 onto the storage device 1002, and executes various processes in accordance with these. As the program, a program may be used that causes a computer to execute at least a part of the operation described in the above-described embodiment. For example, the transmitting unit 110, the receiving unit 120, the configuration information management unit 130, and the initial access information setting unit 140 of the above-described base station apparatus 100 shown in FIG. 7, may be implemented by a control program that is stored in the storage device 1002 and operated by the processor 1001. Additionally, for example, the transmitting unit 210, the receiving unit 220, the configuration information management unit 230, and the initial access control unit 240 of the user equipment 200 shown in FIG. 8 may be implemented by a control program that is stored in the storage device 1002 and operated by the processor 1001. It is described that each of the above-described processes is executed by the single processor 1001; however, it can be simultaneously or sequentially executed by two or more processors 1001. The processor 1001 may be implemented by one or more chips. Here, the program may be transmitted from a network through an electric telecommunication line.

The storage device 1002 may be a computer readable recording medium, and may be formed of, for example, at least one of a ROM (Read Only Memory), an EPROM (Erasable Programmable ROM), an EEPROM (Electrically Erasable Programmable ROM), a RAM (Random Access Memory), and so forth. The storage device 1002 may be referred to as a register, a cache, a main memory (main memory device), and so forth. The storage device 1002 can store a program (program code), a software module, and so forth that can be executed to implement the processing according to the embodiment of the present invention.

The auxiliary storage device 1003 is a computer readable recording medium, and may be formed of, for example, at least one of an optical disk, such as a CD-ROM (Compact Disc ROM); a hard disk drive; a flexible disk; a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and so forth. The auxiliary storage device 1003 may be referred to as an auxiliary storage. The above-described storage medium may be, for example, a database including the storage device 1002 and/or the auxiliary storage 1003, a server, or another appropriate medium.

The communication device 1004 is hardware (transceiver device) for executing communication between computers through a wired network and/or a wireless network; and, for example, the communication device 1004 may also be referred to as a network device, a network control unit, a network card, a communication module, and so forth. For example, each of the above-described transmitting unit 110 and the receiving unit 120 may be implemented by the communication device 1004. Additionally, the transmitting unit 210 and the receiving unit 220 of the user equipment 200 may be implemented by the communication device 1004.

The input device 1005 is an input device (e.g., a keyboard, a mouse, a microphone, a switch, a button, a sensor, etc.) for receiving an input from the outside. The output device 1006 is an output device (e.g., a display, a speaker, a LED lamp, etc.) for providing output to the outside. Here, the input device 1005 and the output device 1006 may be integrated (e.g., a touch panel).

Further, each of the devices, such as the processor 1001 and/or the storage device 1002, is connected by a bus 1007 for communicating information. The bus 1007 may be formed of a single bus, or may be formed of buses that differ depending on a pair of devices.

Further, each of the base station apparatus 100 and the user equipment 200 may be formed to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part or all of the respective functional blocks may be implemented by the hardware. For example, the processor 1001 may be implemented by at least one of these hardware components.

Conclusion of the Embodiments

As described above, according to the embodiments of the present invention, there is provided user equipment for communicating with a base station apparatus, the user equipment includes a receiving unit that receives information to be used for initial access from the base station apparatus; a control unit that determines a plurality of preamble formats based on an index included in the information to be used for the initial access, and that determines one or more resources based on the information to be used for the initial access; and a transmitting unit that transmits a preamble to the base station apparatus using the plurality of preamble formats and the one or more resources.

With the above-described configuration, the user equipment can reduce an overhead for signaling information required for the initial access, and the efficient initial access can be achieved between the user equipment and the base station apparatus.

For each of the one or more resources, one preamble format of the plurality of preamble formats may be specified. With this configuration, an amount of the information required for signaling the information that is required for the initial access can be reduced.

The preamble format that is specified for the resource of the one or more resources that is at an end in a time axis may include a guard period. With this configuration, a process for securing a GP at the end of the preamble becomes unnecessary.

The preamble format may be specified for the resource based on subcarrier spacing or a frequency band of a radio signal used for the communication. With this configuration, a preamble format can be used that is more suitable for the subcarrier spacing or a radio property of the frequency band.

The plurality of resources may be associated with one beam of a plurality of beams transmitted from the base station apparatus, and the resource for transmitting the preamble may be determined from the plurality of resources based on a path-loss value of the one beam. With this configuration, the RACH resource to be used can be selected depending on the path-loss value.

There is provided a base station apparatus for communicating with user equipment, the base station including a transmitting unit that transmits information to be used for initial access to the user equipment; a configurator that configures an index indicating a plurality of preamble formats in the information to be used for the initial access, and that configures information indicating one or more resources in the information to be used for the initial access; and a receiving unit that receives a preamble from the user equipment using the plurality of preamble formats and the one or more resources.

With the above-described configuration, the base station can reduce an overhead for signaling information required for the initial access, and the efficient initial access can be achieved between the user equipment and the base station apparatus.

Additional Embodiments

The embodiments of the present invention are described above; however the disclosed invention is not limited to the embodiments, and a person ordinarily skilled in the art will appreciate various variations, modifications, alternatives, replacements, and so forth. Specific examples of numerical values are used in the description in order to facilitate understanding of the invention; however, these numerical values are merely an example, and any other appropriate values may be used, except as indicated otherwise. The separations of the items in the above description are not essential to the present invention; and depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the procedures described in the embodiments may be changed, as long as there is no contradiction. For the convenience of description of the process, the base station apparatus 100 and the user equipment 200 are described by using the functional block diagrams; however, such devices may be implemented in hardware, software, or combinations thereof. Each of the software to be executed by the processor included in the base station apparatus 100 in accordance with the embodiment of the present invention and the software to be executed by the processor included in the user equipment 200 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Notification of information is not limited to the aspect/embodiment described in the present specification, and may be performed by other methods. For example, notification of information may be performed via physical layer signaling (for example, DCI (Downlink Control Information) or UCI (Uplink Control Information)); upper-layer signaling (for example, RRC (Radio Resource Control) signaling, MAC (Medium Access Control) signaling, broadcast information (MIB (Master Information Block), or SIB (System Information Block)); other signals, or by a combination thereof. Furthermore, RRC signaling may be referred to as an RRC message; and the RRC signaling may be, for example, an RRC connection setup (RRC Connection Setup) message, an RRC connection reconfiguration (RRC Connection Reconfiguration) message, and so forth.

Each aspect/embodiment described in this specification may be applied to LTE (long term evolution), LTE-A (LTE-advanced), SUPER 3G, MT-Advanced, 4G, 5G, FRA (future radio, W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wideband), Bluetooth (registered trademark), any other systems using an appropriate system and/or next generation systems extended based on these systems.

Processing procedures, sequences, flowcharts, and so forth of each embodiment/modified example described in the specification may be exchanged as long as there is no contradiction. For example, for the methods described in the specification, the elements of the various steps are presented in an exemplary order and are not limited to a specific order presented.

The specific operation that is described in this specification to be performed by the base station apparatus 100 may be performed by an upper node of the base station apparatus 100 in some cases. In a network formed of one or more network nodes that includes the base station apparatus 100, it is clear that various operations to be performed for communication with the user equipment 200 can be performed by the base station apparatus 100 and/or another network node other than the base station apparatus 100 (for example, the MME or the S-GW can be considered; however, it is not limited to these). In the above, the case is exemplified where there is one network node other than the base station apparatus 100; however, a combination of a plurality of other network nodes (e.g., the MME and the S-GW) may be used.

Each aspect/embodiment described in the specification may be used alone; may be combined to be used; or may be switched in accordance with execution.

The user equipment 200 may be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a hand set, a user agent, a mobile client, a client, or some other suitable terms, by a person ordinarily skilled in the art.

The base station apparatus 100 may be referred to as a NB (NodeB), an eNB (enhanced NodeB), a base station (Base Station) or or some other suitable terms, by a person ordinarily skilled in the art.

The terms "determining" and "deciding" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

As long as "include," "including," and the variations thereof are used in the specification and the claims, these terms are intended to be inclusive, similar to the term "comprising." Furthermore, it is intended that the team "or" used in this specification or the claims is not "exclusive OR."

In the whole of the present disclosure, for example, if articles are added by translation, such as "a," "an," and "the" in English, these articles may include a plurality of things, unless as clearly indicated otherwise by the context.

Note that, in the embodiments of the present invention, the initial access control unit 240 is an example of a control unit. The initial access information setting unit 140 is an example of a configurator.

The present invention is described in detail above; however, it is apparent to a person ordinarily skilled in the art that the present invention is not limited to the embodiments described in the present specification. The present invention can be implemented as modifications and alterations without departing from the sprit and scope of the present invention that are defined by the descriptions of the claims. Accordingly, an object of the description of this specification is for exemplification and illustration; and the description of this specification does not have any restrictive meaning to the present invention.

LIST OF REFERENCE SYMBOLS 100 base station apparatus
200 user equipment
110 transmitting unit
120 receiving unit
130 configuration information management unit
140 initial access information setting unit
200 user equipment
210 transmitting unit
220 receiving unit
230 configuration information management unit
240 initial access control unit
1001 processor
1002 storage device
1003 auxiliary storage device
1004 communication device
1005 input device
1006 output device

The invention claimed is:

1. A terminal for communicating with a base station apparatus, the terminal comprising:
   a receiver that receives information related to random access;
   a processor that identifies, based on the information related to the random access, a first preamble format, a second preamble format, and random access channel resources, wherein the information related to the random access includes an index for specifying the first preamble format and the second preamble format;
   a transmitter that transmits a random access preamble using the random access channel resources,
   wherein the transmitter transmits the random access preamble using a last resource in a time domain of the random access channel resources and the second preamble format,
   the transmitter transmits the random access preamble using a resource other than the last resource in the time domain and the first preamble format, and
   a time period during which no preamble is transmitted is included in a preamble format of a random access preamble.

2. The terminal according to claim 1, wherein the processor identifies, based on the information related to the random access, preamble formats respectively corresponding to the random access channel resources.

3. The terminal according to claim 2, wherein the time period during which no preamble is transmitted is included in the preamble format of the random access preamble transmitted using the last resource in a time axis among the random access channel resources.

4. The terminal according to claim 2, wherein the processor identifies, based on a frequency band used for transmission of the random access preambles, the first preamble format and the second preamble format used for the random access channel resources.

5. The terminal according to claim 2, wherein the receiver receives the information related to the random access using a physical downlink shared channel (PDSCH: Physical Downlink Shared CHannel).

6. The terminal according to claim 2, wherein the receiver receives the information related to the random access using system information.

7. The terminal according to claim 1, wherein the time period during which no preamble is transmitted is included in the preamble format of the random access preamble transmitted using the last resource in a time axis among the random access channel resources.

8. The terminal according to claim 7, wherein the processor identifies, based on a frequency band used for transmission of the random access preambles, the first preamble format and the second preamble format used for the random access channel resources.

9. The terminal according to claim 7, wherein the receiver receives the information related to the random access using a physical downlink shared channel (PDSCH: Physical Downlink Shared CHannel).

10. The terminal according to claim 7, wherein the receiver receives the information related to the random access using system information.

11. The terminal according to claim 1, wherein the processor identifies, based on a frequency band used for transmission of the random access preambles, the first preamble format and the second preamble format used for the random access channel resources.

12. The terminal according to claim 11, wherein the receiver receives the information related to the random access using a physical downlink shared channel (PDSCH: Physical Downlink Shared CHannel).

13. The terminal according to claim 11, wherein the receiver receives the information related to the random access using system information.

14. The terminal according to claim 1, wherein the receiver receives a synchronization signal using an SS block,
  wherein the random access channel resources are associated with beams applied to the SS blocks, and
  wherein the processor determines, based on a path-loss value, the random access channel resources.

15. The terminal according to claim 14, wherein the receiver receives the information related to the random access using a physical downlink shared channel (PDSCH: Physical Downlink Shared CHannel).

16. The terminal according to claim 14, wherein the receiver receives the information related to the random access using system information.

17. The terminal according to claim 1, wherein the receiver receives the information related to the random access using a physical downlink shared channel (PDSCH: Physical Downlink Shared CHannel).

18. The terminal according to claim 1, wherein the receiver receives the information related to the random access using system information.

19. A base station apparatus comprising:
  a processor that configures information related to random access based on a first preamble format, a second preamble format, and random access channel resources, wherein the information related to the random access includes an index for specifying the first preamble format and the second preamble format;
  a transmitter that transmits the information related to the random access; and
  a receiver that receives a random access preamble based on the random access channel resources,
  wherein the receiver receives the random access preamble based on the second preamble format in a last resource in a time domain of the random access channel resources, and the receiver receives the random access preamble based on the first preamble format in a resource other than the last resource in the time domain, and
  wherein a time period during which no preamble is transmitted is included in a preamble format of a random access preamble.

20. A communication method executed by a terminal, the method comprising:
  receiving information related to random access;
  identifying, based on the information related to the random access, a first preamble format, a second preamble format, and random access channel resources, wherein the information related to the random access includes an index for specifying the first preamble format and the second preamble format; and
  transmitting a random access preamble using the random access channel resources,
  wherein the transmitting further transmits the random access preamble using a last resource in a time domain of the random access channel resources and the second preamble format,
  the transmitting further transmits the random access preamble using a resource other than the last resource in the time domain and the first preamble format, and
  wherein a time period during which no preamble is transmitted is included in a preamble format of a random access preamble.

* * * * *